US010247391B2

(12) United States Patent
Adams, IV et al.

(10) Patent No.: US 10,247,391 B2
(45) Date of Patent: Apr. 2, 2019

(54) STAKE FOR HOLDING A DECORATIVE LIGHT

(71) Applicant: Adams Mfg. Corp., Portersville, PA (US)

(72) Inventors: William E. Adams, IV, Harmony, PA (US); Kevin A. Harper, Mason, OH (US)

(73) Assignee: Adams Mfg. Corp., Portersville, PA (US)

( * ) Notice: Subject to any disclaimer, the term of this patent is extended or adjusted under 35 U.S.C. 154(b) by 33 days.

(21) Appl. No.: 15/788,911

(22) Filed: Oct. 20, 2017

(65) Prior Publication Data

US 2018/0112855 A1 Apr. 26, 2018

Related U.S. Application Data

(60) Provisional application No. 62/411,156, filed on Oct. 21, 2016.

(51) Int. Cl.
| | |
|---|---|
| *F21V 17/04* | (2006.01) |
| *F21V 17/16* | (2006.01) |
| *F21V 21/08* | (2006.01) |
| *F16M 1/00* | (2006.01) |
| *F21S 4/10* | (2016.01) |
| *F21W 121/00* | (2006.01) |

(52) U.S. Cl.
CPC ............... *F21V 17/04* (2013.01); *F16M 1/00* (2013.01); *F21V 17/164* (2013.01); *F21V 21/0824* (2013.01); *F21S 4/10* (2016.01); *F21W 2121/00* (2013.01)

(58) Field of Classification Search
CPC .... F21V 17/04; F21V 17/164; F21V 21/0824; F21S 4/10; F21W 2121/00
See application file for complete search history.

(56) References Cited

U.S. PATENT DOCUMENTS

| 4,851,977 A | 7/1989 | Gary |
| 4,870,548 A * | 9/1989 | Beachy .................. F21S 8/081 362/145 |
| 4,901,212 A | 2/1990 | Prickett |
| 4,905,131 A | 2/1990 | Gary |

(Continued)

OTHER PUBLICATIONS

Adams Manufacturing, 8" Light Stakes, http://www.adamsmfg.com/products/holiday-accessories, Oct. 18, 2017.

*Primary Examiner* — Alan B Cariaso
(74) *Attorney, Agent, or Firm* — Buchanan Ingersoll & Rooney PC (57) ABSTRACT

A stake for holding decorative lights has a stake portion having a pointed end and a head attached to the opposite end of the stake portion. The head has an open center and a top portion. A bulb gripper is pivotably attached to the inner surface of the top portion, such that the bulb gripper can be moved from a position which is co-linear with a centerline through the stake portion to a position which is substantially perpendicular to the centerline through the stake. The bulb gripper has a tab sized and positioned to engage another tab on the head when the bulb gripper is in a position which is substantially perpendicular to the stake portion locking the bulb gripper in place.

21 Claims, 9 Drawing Sheets

(56) References Cited

U.S. PATENT DOCUMENTS

| | | | | |
|---|---|---|---|---|
| 5,055,984 A | * | 10/1991 | Hung | F21S 8/081 |
| | | | | 136/291 |
| D331,360 S | | 12/1992 | Adams | |
| 5,570,952 A | | 11/1996 | Protz, Jr. | |
| D382,469 S | * | 8/1997 | Adams | D21/840 |
| 5,667,174 A | | 9/1997 | Adams | |
| 2006/0164252 A1 | * | 7/2006 | Richmond | F21V 21/0824 |
| | | | | 340/606 |
| 2012/0106142 A1 | * | 5/2012 | Jensen | F21L 4/08 |
| | | | | 362/190 |
| 2018/0187867 A1 | * | 7/2018 | Adams, IV | F21V 17/16 |

* cited by examiner

STAKE FOR HOLDING A DECORATIVE LIGHT

CROSS-REFERENCE TO RELATED APPLICATION

Applicants claim the benefit of U.S. Provisional Patent Application Ser. No. 62/411,156 filed Oct. 21, 2016.

FIELD OF THE INVENTION

This invention relates to stakes for displaying decorative lights.

DESCRIPTION OF THE PRIOR ART

The use of lights for decorating the exterior of a house or a yard is well known. Decorative lights typically consist of a large number of light sockets being wired together with light bulbs positioned in the light sockets. The string of lights is then attached to the face of a building, wrapped around a tree or hung on a seasonal display. The string of lights can be mounted by holders which retain either the light socket or the wire. The object of these holders is to display the lights so that they can easily be seen. The holders must not be adversely affected by cold temperatures and should be able to hold the lights during high winds which commonly accompany winter storms. Occasionally, the string of lights is strung on poles alongside a driveway, flower bed, or sidewalk, usually by tying the wire to the poles so that there are several lights between poles.

U.S. Pat. No. 5,667,174 discloses a stake having a light holder for holding decorative lights. The light holder, sometimes now called a bulb gripper, has an S-shaped portion which is sized to grasp the socket of a decorative light. This product is packaged in sets of 25 and used to hold a string of Christmas lights. Christmas lights were at one point primarily sold in three sizes: mini, standard (C7) and outdoor (C9). Hence, the light holder is made of a resilient material so that the distal end and the proximate end can be sufficiently spread apart to receive a decorative light socket and then close to grasp the socket. In the preferred embodiment shown in FIG. 4 of the patent one half of the S-shape is sized to hold a mini light socket and the other half is larger and sized to hold the standard and outdoor sockets.

U.S. Pat. No. Des. 331,360 discloses a hook for supporting Christmas lights adjacent roofing shingles. This hook is comprised of a small stake which fits between the shingles having a single spiral at one end. The spiral end is sized to hold the wire of the Christmas light string, not a bulb or socket. Similar devices comprised of a stake or straight pin with a curved holder attached at one end have been used to retain other structures or products.

Another prior art device provides an L-shaped light support bracket with one of the legs being fitted under a shingle. The other leg includes a hole sized to receive a light bulb. This type of light support bracket can also be positioned within a retaining strip which is permanently attached to a flat building surface. Examples of these light mountings are shown in U.S. Pat. Nos. 4,905,131; 4,901,212 and 4,851,977. These products have been sold under the trademark "LITES UP" by Gary Products Group, Inc.

Adams Mfg. makes an 8" light stake like that shown in U.S. Pat. No. 5,667,174. In that product the bulb gripper is molded on the top of and co-linear with a centerline through the stake and then folded down to be perpendicular to that centerline as shown in the patent drawings. The product is sold in the as molded condition and the user of the stake must then rotate the bulb gripper 90 degrees to make it substantially perpendicular to the stake portion. The bulb grippers are able to be rotated through the incorporation of living hinges. While this type of stake allows for more dense packing and more efficient molding, the downward rotation causes the effective height of the stake to be decreased by the length of the bulb gripper. There is a need for a stake where the bulb gripper swings upward so that the height of the stake as molded and packaged is not decreased by the length of the bulb gripper. Stakes such as those shown in U.S. Pat. No. 5,667,174 or such as made by Adams Mfg. that rotate downward often have a flat at the top of the stake portion which can be used to hammer in the stakes. However, users who are hammering in stakes must either insert the light bulb or light socket into the stake after the stake has been hammered into the ground or, if hammering the stake with the bulb already inserted, the user must be careful not to hit the bulb. In either case the creation of a light display is made more cumbersome than is optimal. There is a need for a stake where hammering is not necessary.

Another stake on the market is similar to that shown in U.S. Pat. No. 5,570,952. That stake is designed to retain a light by feeding the cord through a slot on each side of the head and resting the socket in the head. It can be difficult to install strings of lights with this type of light stake. Also, this type of light stake was designed for incandescent lights which have sockets with flat bottoms which rest in the head of the stake. Many lights on the market are now LEDs which do not have a flat bottom and often have wires coming directly out of the bottom of the sockets. LEDs also have different types of wires—they utilize thin wires which are braided together instead of two wires fixed side-by-side. The LED wires do not lock well into the cord grippers on that type of stake. There is a need for a light stake that can fit both LED and incandescent lights, and for which assembly of the lights into the stakes is fast and easy.

An optimal method for displaying lights with light stakes is to load the bulb into the stake before the stake is inserted in the ground, then to push the stake into the ground by hand. If the ground is too hard and/or rocky, it can be faster and easier to use a screwdriver to make a pilot hole as a lead-in for the stakes. Even when the ground is soft, the use of a screwdriver helps to create a plumb pilot hole which then helps to keep the stakes plumb for a nicer display. But all of the stakes mentioned heretofore have hooks or bulb grippers that have some relatively sharp corners on the top where the user pushes the stake which can cause discomfort or even cuts or scrapes to the user's hand. If the bulb gripper is in a position perpendicular to a centerline through the stake the user can easily be pushing on the bulb gripper instead of or as well as the top of the stake, that may cause the bulb gripper to break. There is a need for a stake capable of holding a decorative light that can be manually pushed into the ground without breaking or causing undue discomfort to the user.

SUMMARY OF THE INVENTION

We provide a stake for holding decorative lights which has a stake portion having a proximate end and a distal end suitable for being inserted into a ground surface. There is a head attached to the proximate end of the stake, the head having an open center and a top portion. A bulb gripper is pivotably attached to the inner surface of the top portion, such that the bulb gripper can be moved from a position which is co-linear with a centerline through the stake portion to a position which is substantially perpendicular to the centerline through the stake portion. The bulb gripper has a first tab sized and positioned to engage a second tab on the head when the bulb gripper is in a position which is substantially perpendicular to the centerline stake locking the bulb gripper in place. When so positioned the angle between the bulb gripper and the centerline through the stake will be 90° plus or minus 5°.

Preferably the top surface of the head is curved and ribs may be present on that top surface.

The bulb gripper preferably has a U-shaped body with teeth extending inward from the inner surface that define at least one opening sized to receive a decorative light. The teeth and the body may define a ledge sized to receive a neck of a decorative light bulb. The neck is the indent formed by the top of the light socket and the base of the bulb before it flares wider. The bulb gripper may also have at least one arm which is curved such that the at least one arm can flex toward the U-shaped body.

Other aspects and advantages of our stakes for holding decorative lights will become apparent from a description of certain present preferred embodiments thereof shown in the drawings.

DESCRIPTION OF THE PREFERRED EMBODIMENTS

Referring to FIGS. 1, 2, 3 and 4, a first present preferred embodiment of our stake for holding a decorative light 1 has a stake portion 2 which has a distal end 3 that is pointed for insertion into the ground. A head 10 is attached to the opposite or proximate end of the stake. We prefer that the stake have a plus-shaped cross-section created by four ribs 4 that extend along the length of the stake portion 2. We also prefer to provide a pie shaped stop 6 between adjacent ribs and wings 8 on a pair of opposite ribs that indicate how far the stake portion should be pushed into the ground. The resistance created by the stops 6 and wings 8 should enable the user to feel when the stake has been inserted to the proper depth. If all of the stakes holding a string of decorative lights are inserted a same amount then all of the light bulbs in that string of decorative lights will all be aligned in a single horizontal plane creating a pleasing display.

The wings 8 are shaped to enable a user to grasp the stake at the wings. Then the user can grasp the stake with one hand at the wings while pushing the top of the stake with the other hand. If the ground is soft or a pilot hole has been made then the user could push the stake into the ground or into a pilot hole made in the ground while holding the stake only at the wings.

A head 10 having an open center 11 with an inner surface 12 and a top portion 14 is attached to the proximate end of the stake portion. The top portion 14 of the head preferably has a curved outer surface 15 or a flat portion with curved ends. Preferably the head 10 has a shape similar to a rectangle with rounded corners. We prefer to provide a rib 13 on the inner surface 12 of the head.

Figure 2:
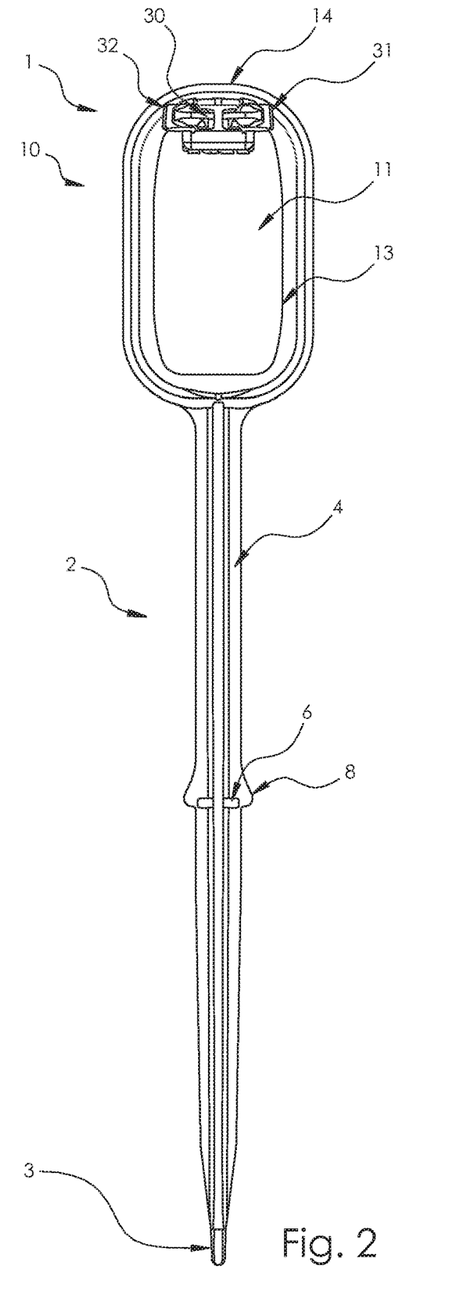
FIG. 2 is front view of the embodiment shown in FIG. 1 when the bulb gripper is positioned substantially perpendicular to a centerline through the stake portion.

A bulb gripper 30 is attached to the top portion 14 of the head 10 by a hinge 20. One leaf 21 of the hinge 20 is attached to the inner surface 12 of the head opposite the curved outer surface 15. The second leaf 22 of the hinge 20 is attached to, or is part of, the base 33 of the bulb gripper 30. There is a first tab 23 having a tooth. The tab 23 extends from the top portion of the head 10 and is opposite the first leaf 21 of the hinge 20. A second tab 25 having a tooth extends from the second leaf 22 of the hinge 20 or from the base of the bulb gripper 30. When the bulb gripper 30 is in a position which is substantially perpendicular to a centerline through the stake portion as shown in FIGS. 2 and 3 the tabs 23 and 25 will engage one another locking the bulb gripper 30 in place.

We prefer that the first leaf 21 of the hinge 20 be a pair of spaced apart segments rather than being a single narrower leaf as is commonly used in the prior art to connect a blub gripper to a stake or other housing. Using two spaced apart segments creates a more stable connection using about the same amount of plastic as in the narrow leaf hinge of the prior art.

Figure 1:
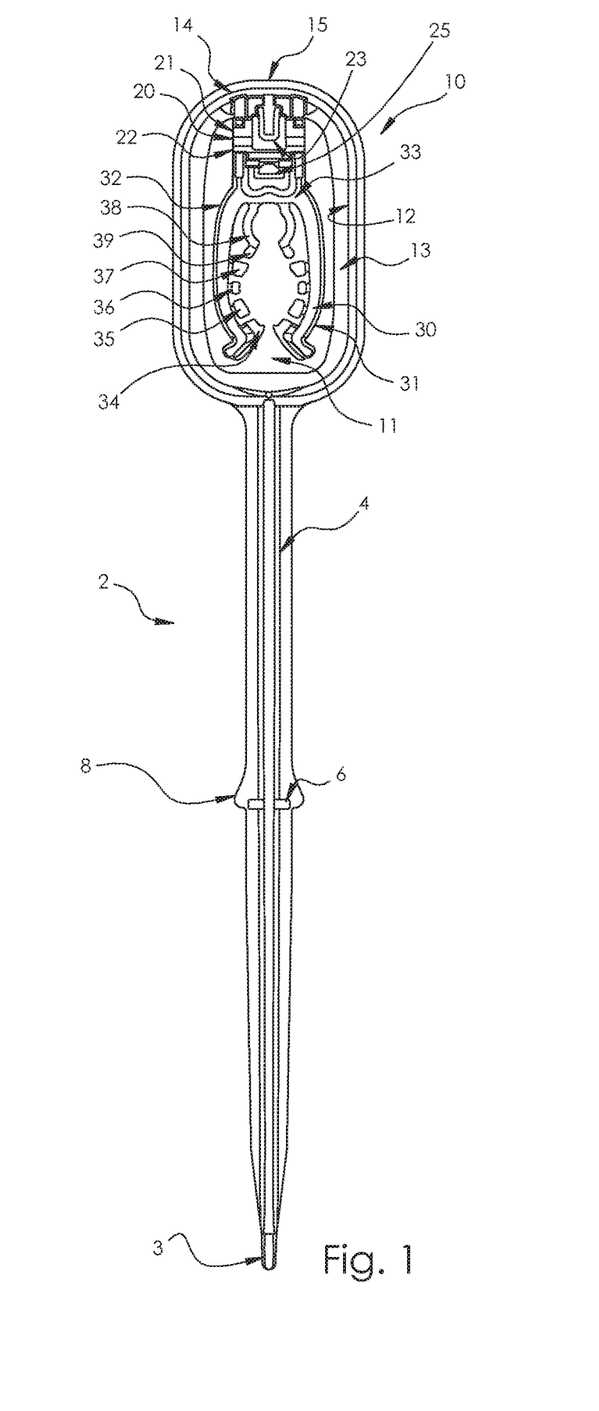
FIG. 1 is front view of a present preferred embodiment of our stake for holding a decorative light when the bulb gripper is positioned co-linear with a centerline through the stake portion.
Figure 3:
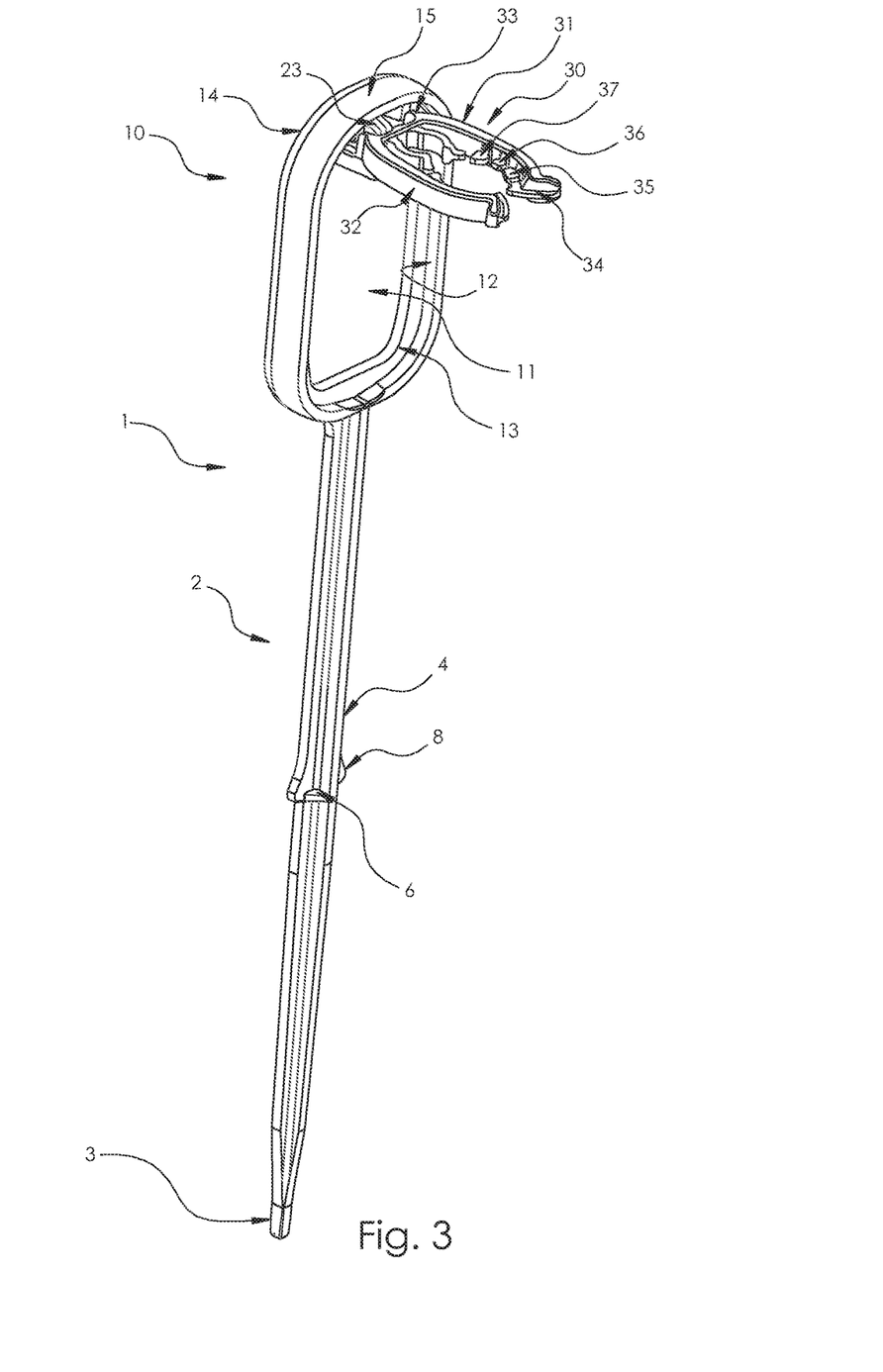
FIG. 3 is perspective view of the present preferred embodiment as shown in FIG. 2.
Figure 4:
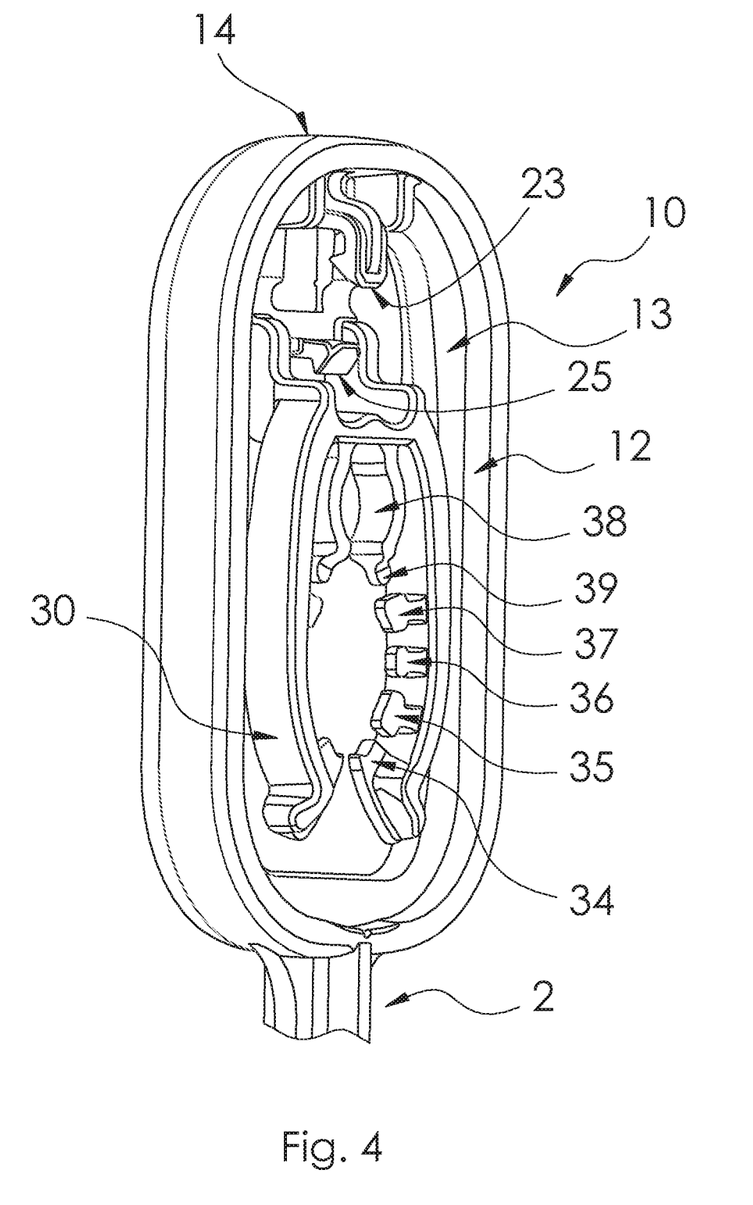
FIG. 4 is perspective view of the head of our stake when the bulb gripper is positioned as shown in FIG. 1.

As can be seen most easily in FIGS. 1, 3 and 4, the bulb gripper 30 has two arms 31, 32 attached to a base 33 that together form a U-shaped body. The interior surface of each arm of the body has an inward tooth 34 near the opening followed by three spaced apart projections 35, 36, 37. A smaller U-shaped projection 38 is at the base of the body. This smaller U-shaped projection 38 is sized to hold a mini-light. Because a mini has a bulb which is straight, the U-shaped projection is intended to grip mini lights by the socket and C3, C4, C5, and some smaller diameter C6 lights at the neck. The flats 39 at the ends of the U-shaped projection, along with tooth 34 and three projections 35, 36, 37 on each arm 31, 32 define a circular opening that is sized to receive and securely hold the socket of a C7 light. The arms can flex outward so that the body can receive and securely hold the socket containing a C9, C12 or any new G-sized decorative light.

Figure 5:
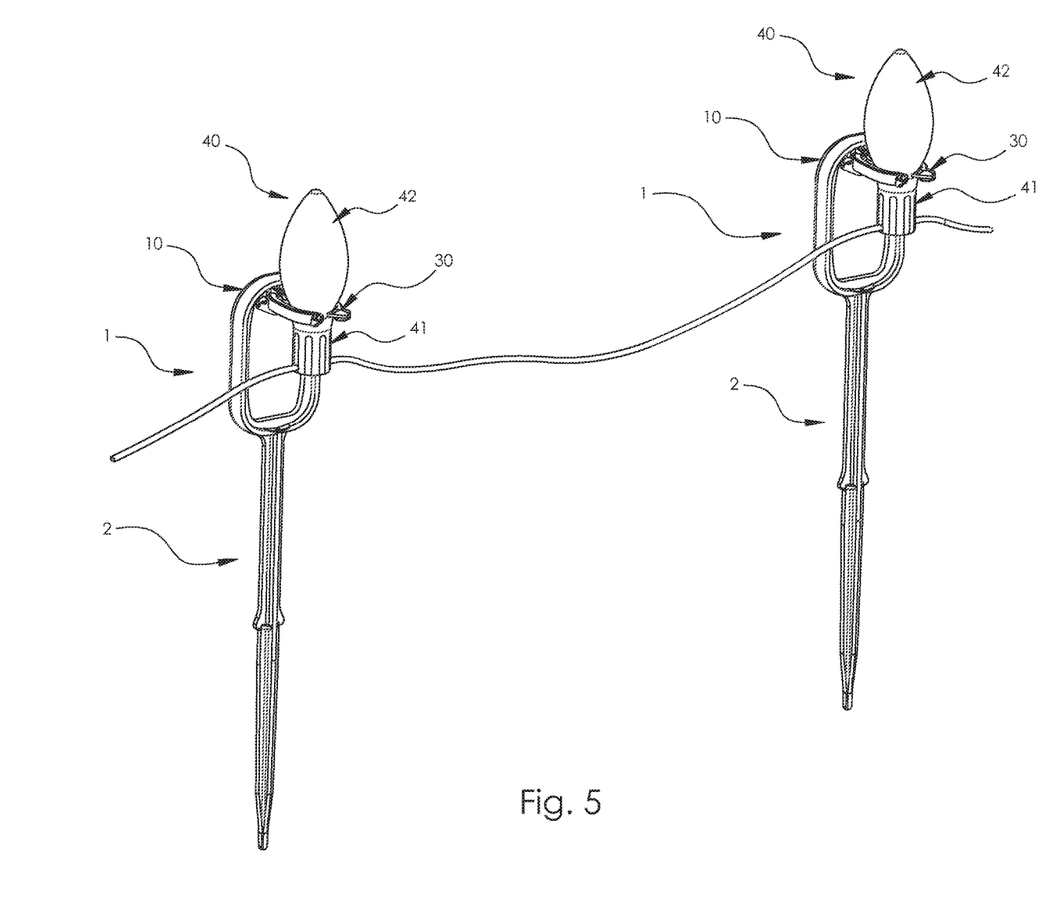
FIG. 5 is perspective view of two of our stakes for holding a decorative light configured as in FIGS. 2 and 3 holding a portion of a string of decorative lights with the bulb portion of the light bulbs being held above the bulb gripper.
Figure 6:
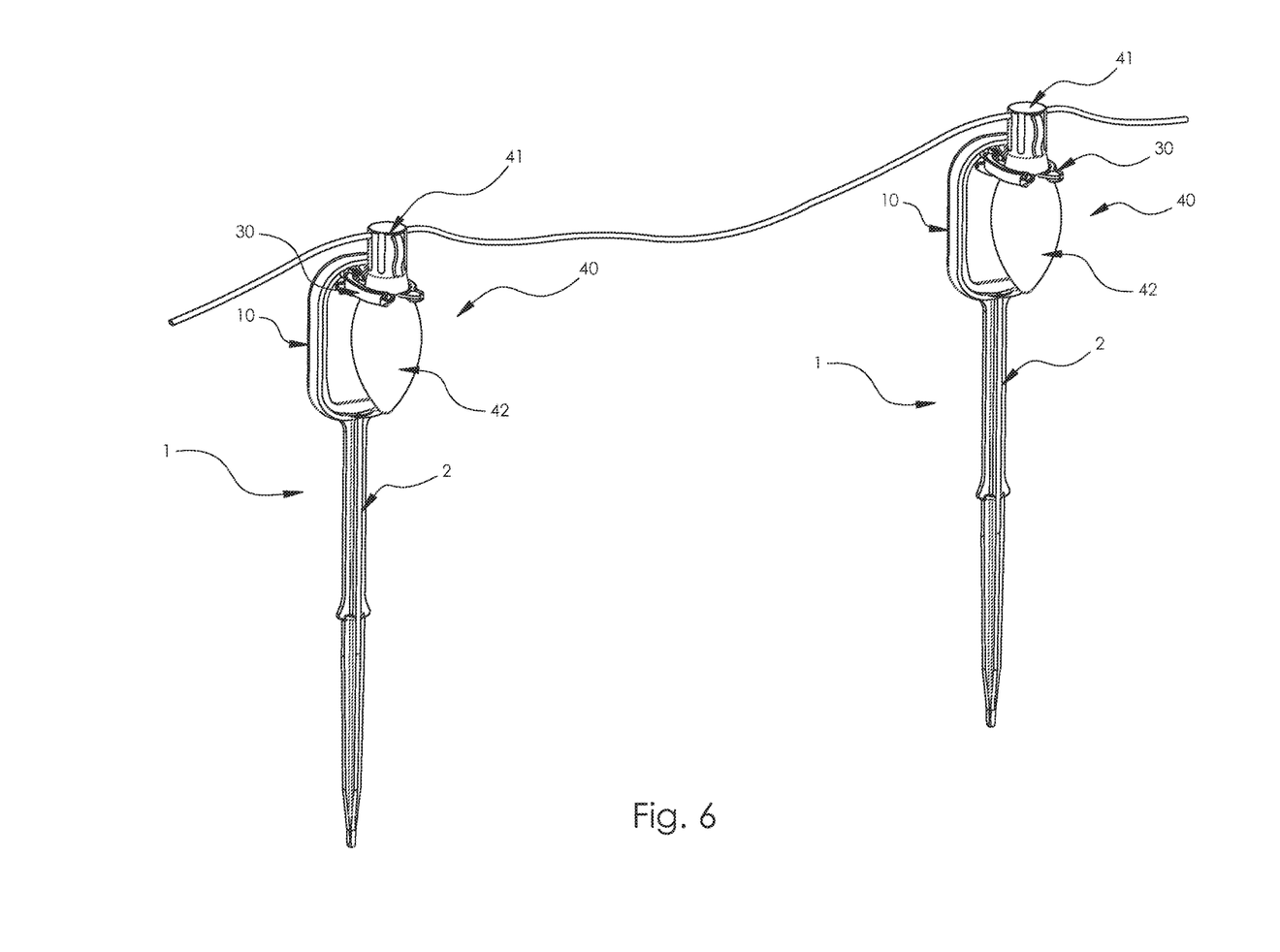
FIG. 6 is perspective view similar to FIG. 5 in which two of our stakes for holding a decorative light are holding a portion of a string of decorative lights with the bulb portion of the light bulbs being held below the bulb gripper.
Figure 7:
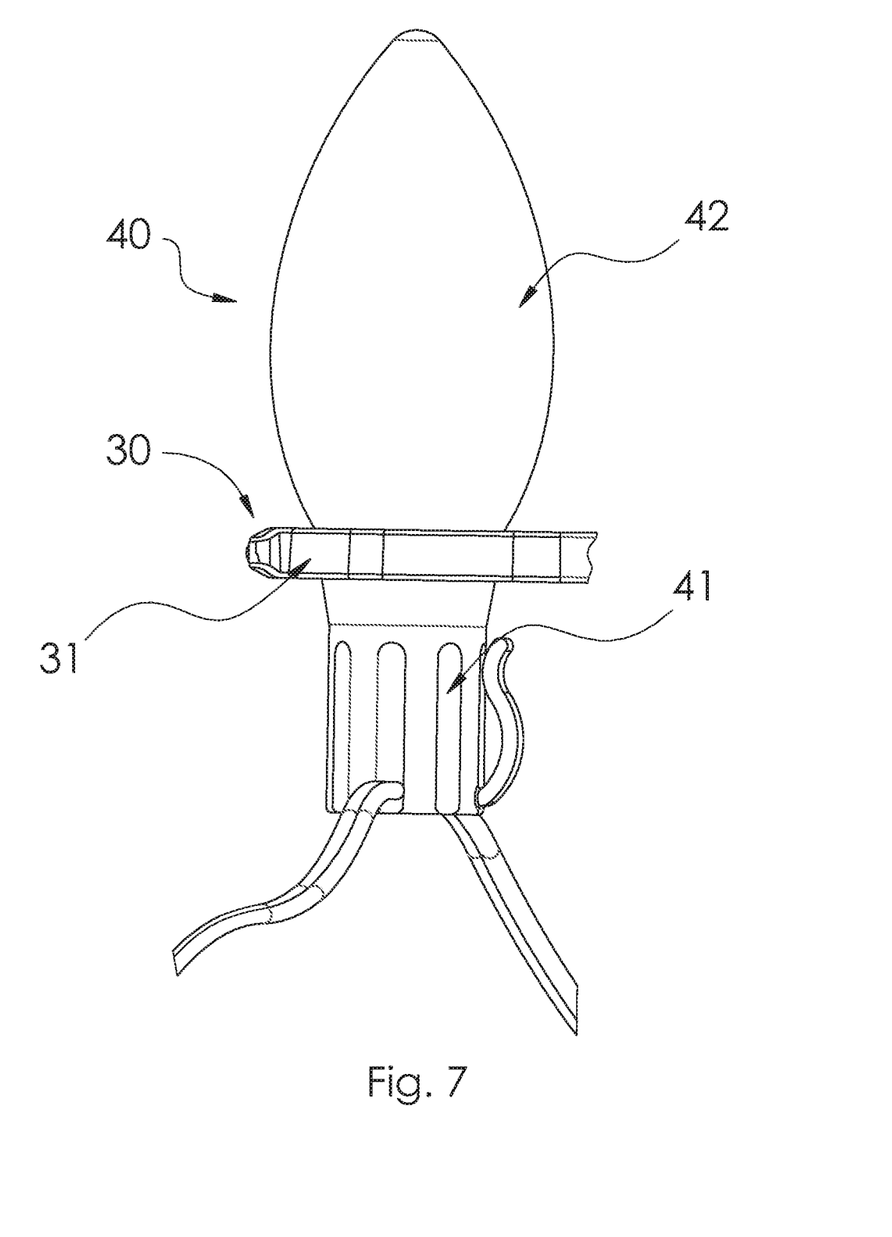
FIG. 7 is a side view of a decorative light being held by a portion of the bulb gripper as in FIG. 5.

In recent years LED lights have become available that differ somewhat in size from their incandescent counterparts and are sold in new sizes called C3, C4, C5 and C6 as well as being available in just about any other size that incandescent lights are offered in. Furthermore, the socket can also vary in size depending upon the manufacturer. The bulb gripper disclosed here can be used to securely hold traditional decorative lights as well as the newer LED decorative lights. The bulb gripper 30 engages the decorative light 40 just above the top of the socket 41 and the neck of the bulb 42, except for mini-lights which do not have a narrower neck. This can be seen in FIG. 7. The projections 35, 36, 37 on each arm 31, 32 that project inward from the U-shaped body of the bulb gripper, the tooth 34 and the flats 39 are thin and form a ledge which supports the decorative light and prevents the light from moving up or down. The ledge helps the arms securely hold the light bulb in an upright vertical position shown in FIG. 5 or in an inverted vertical position shown in FIG. 6 and assures that all of the lights bulbs in a set of these light stakes are held the same position. The projections 35, 36, 37, tooth 34 and flats 39 that form the ledge may be mid-way between the top surfaces and the bottom surfaces of the arms or close to either the top surfaces or the bottom surfaces of the arms. Alternatively, the ledge may be formed by a single projection on each arm rather than multiple projections on each arm as shown in the drawings.

The stake for holding decorative lights disclosed in FIGS. 1 through 6 has a curved top with no sharp edges and can be pushed into the ground while the bulb gripper is either co-linear with the stake and not projecting outward, or substantially perpendicular to the stake. Even with a bulb inserted into a substantially perpendicular bulb gripper, the head of the stake can be grasped and pushed down. As a result the stake can be pushed into the ground without causing cuts, scrapes or other injury or discomfort to the hand while pushing the stake into the ground.

Figure 8:
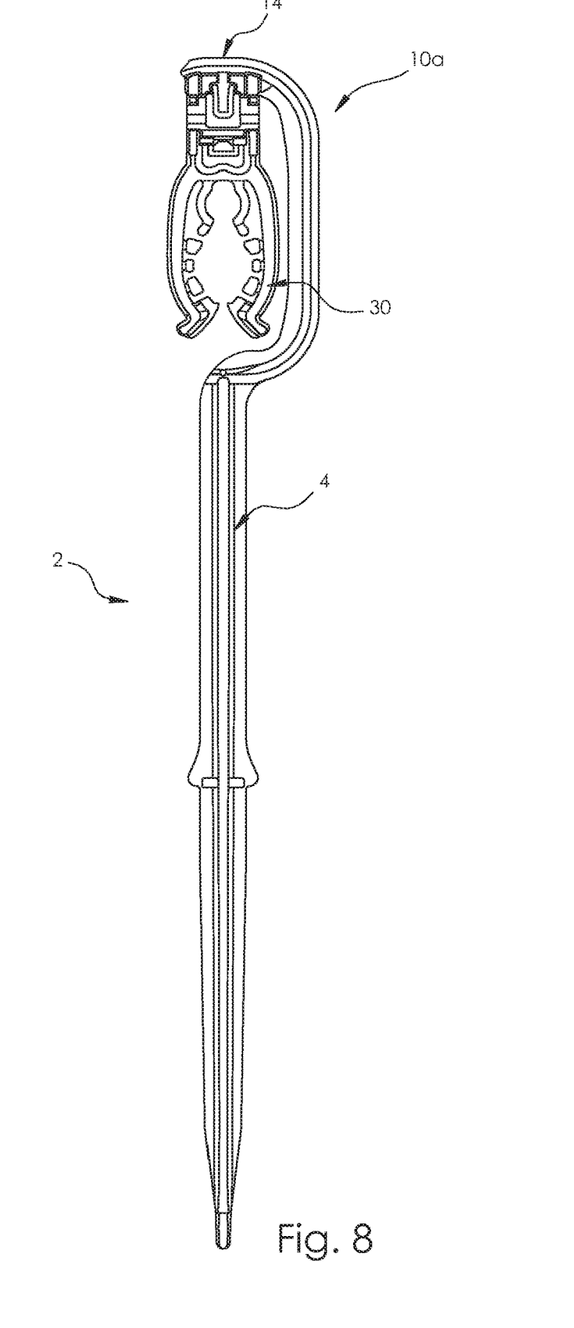
FIG. 8 is front view of a second present preferred embodiment of our stake for holding a decorative light when the bulb gripper is positioned co-linear with a centerline through the stake portion.

A second present preferred embodiment of our stake for holding a decorative light is shown in FIG. 8. This stake also has a stake portion 2 which has a distal end that is pointed for insertion into the ground. We prefer that the stake have a plus-shaped cross-section created by four ribs 4 that extend along the length of the stake portion 2. The head 10a is similar to the head in the previous embodiment but is C-shaped rather than rectangular. The bulb gripper 30 and hinge connection to the top portion 14 as well as the locking structure are the same as in the embodiment shown in FIGS. 1 through 6. The bulb gripper 30 can move from a position within the open center of the head 10 shown in FIG. 8 to a position which is substantially perpendicular to the centerline through the stake portion. There the tabs will engage one another locking the bulb gripper in place.

Figure 9:
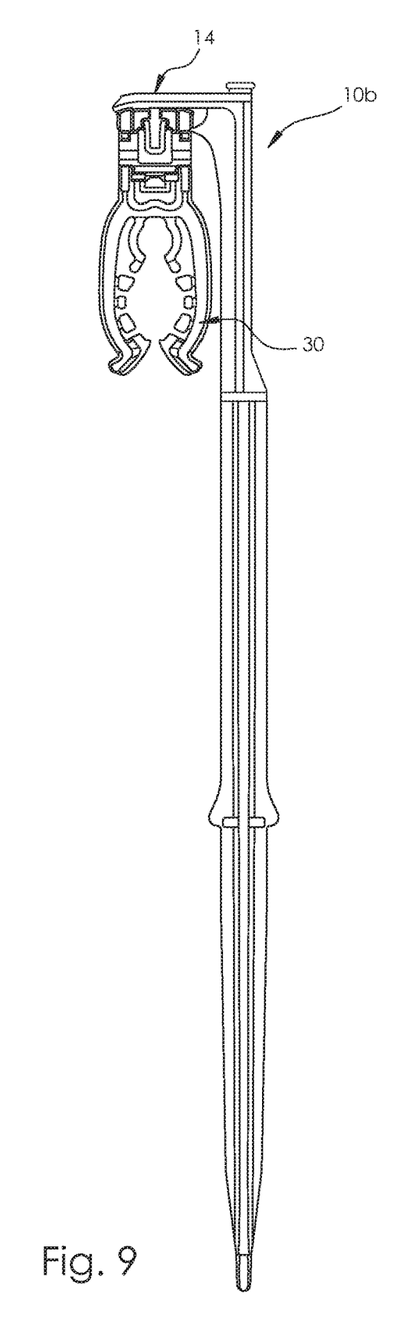
FIG. 9 is front view of a third present preferred embodiment of our stake for holding a decorative light when the bulb gripper is positioned in a plane passing through a centerline through the stake portion.

In a third present preferred embodiment of our stake for holding a decorative light is shown in FIG. 9 the head 10b has an inverted L-shape which also has a rib on the inner surface of the head. The same bulb gripper 30 is attached to the top portion 14 of the head 10b using the same hinge and locking structure as in the previous embodiments. However, in this embodiment the bulb gripper is offset from a centerline through the stake portion and positioned in a plane passing through a centerline through the stake portion. The bulb gripper can move from the position shown in FIG. 9 to a position which is substantially perpendicular to the plane passing through the centerline through the stake portion. When so positioned, the tabs will engage one another locking the bulb gripper in place.

Our light stake allows the user to load from one to every light bulb in a string of lights into a stake before inserting the stake into the ground. This preloading may be easier than attaching a light bulb to a stake that has been inserted into the ground. Furthermore, the user can create a more precise spacing between lights by inserting the first bulb-in-stake combination into the ground and the pulling each subsequent bulb-in-stake combination slightly taut before inserting that combination into the ground. The wires between the bulbs are thus used as a measuring stick.

Preferably the stakes for holding a decorative light are made entirely of plastic and the hinges are living hinges. We prefer to use polypropylene. But the product could be made of a comparable plastic which permits the bulb gripper to move from the vertical position to the substantially horizontal position shown in the drawings and permits the arms in the bulb gripper to flex.

Although we have shown and described certain present preferred embodiments of our stake for a holding decorative light it should be distinctly understood that our invention is not limited thereto but may be variously embodied within the scope of the folowing claims.

We claim:

1. A stake for holding a decorative light comprising:
   a stake portion having a proximate end and a distal end suitable for being inserted into a ground surface;
   a head attached to the proximate end of the stake portion, the head having an open center and a top portion, the top portion having an outer surface and an inner surface;
   a bulb gripper pivotably attached to the inner surface of the top portion, such that the bulb gripper can be moved from a position which is co-linear with a centerline through the stake portion to a position which is substantially perpendicular to the centerline through the stake portion;
   a first tab on the bulb gripper and a second tab on the head, the first tab and the second tab sized and positioned so that when the bulb gripper is in a position which is substantially perpendicular to the centerline through the stake portion, the tabs will engage one another locking the bulb gripper in place.

2. The stake of claim 1 wherein the head has a curved top surface.

3. The stake of claim 1 also comprising a rib on the inner surface of the head.

4. The stake of claim 1 wherein the bulb gripper is comprised of a base and a pair of spaced apart, flexible arms attached to the base, the base and the arms together forming a U-shaped body.

5. The stake of claim 4 wherein each arm has an inner surface that faces toward the inner surface of the other arm, also comprising a plurality of projections on the inner surface of each arm, the projections defining at least one opening sized to receive a decorative light.

6. The stake of claim 5 wherein the projections define a ledge sized to receive a neck of a decorative light bulb.

7. The stake of claim 1 also comprising a stop on the stake portion.

8. The stake of claim 1 also comprising a pair of wings on the stake portion.

9. The stake of claim 8 wherein the wings are shaped to enable a user to grasp the stake at the wings.

10. The stake of claim 1 wherein the stake is comprised of polypropylene.

11. The stake of claim 1 wherein the bulb gripper is attached to the head by a living hinge.

12. A stake for holding a decorative light comprising:
    a stake portion having a proximate end and a distal end suitable for being inserted into a ground surface;
    a head attached to the proximate end of the stake portion, the head having an inverted L-shape containing a top portion, the top portion having an outer surface and an inner surface;

a bulb gripper pivotably attached to the inner surface of the top portion, such that the bulb gripper can be moved from a position within a plane passing through a centerline through the stake portion to a position which is substantially perpendicular to the plane passing through the centerline through the stake portion;

a first tab on the bulb gripper and a second tab on the head, the first tab and the second tab sized and positioned so that when the bulb gripper is in a position which is substantially perpendicular to the plane passing through the centerline through the stake portion, the tabs will engage one another locking the bulb gripper in place.

13. The stake of claim 12 also comprising a rib on the inner surface of the head.

14. The stake of claim 12 wherein the bulb gripper is comprised of a base and a pair of spaced apart, flexible arms attached to the base, the base and the arms together forming a U-shaped body.

15. The stake of claim 14 wherein each arm has an inner surface that faces toward the inner surface of the other arm, also comprising a plurality of projections on the inner surface of each arm, the projections defining at least one opening sized to receive a decorative light.

16. The stake of claim 15 wherein the projections define a ledge sized to receive a neck of a decorative light bulb.

17. The stake of claim 12 also comprising a stop on the stake portion.

18. The stake of claim 12 also comprising a pair of wings on the stake portion.

19. The stake of claim 18 wherein the wings are shaped to enable a user to grasp the stake at the wings.

20. The stake of claim 12 wherein the stake is comprised of polypropylene.

21. The stake of claim 12 wherein the bulb gripper is attached to the head by a living hinge.

* * * * *